J. R. WILLIS AND R. J. FISHER.
FLUID, SEMIFLUID, OR PLASTIC EJECTOR.
APPLICATION FILED APR. 7, 1919.
1,325,386. Patented Dec. 16, 1919.
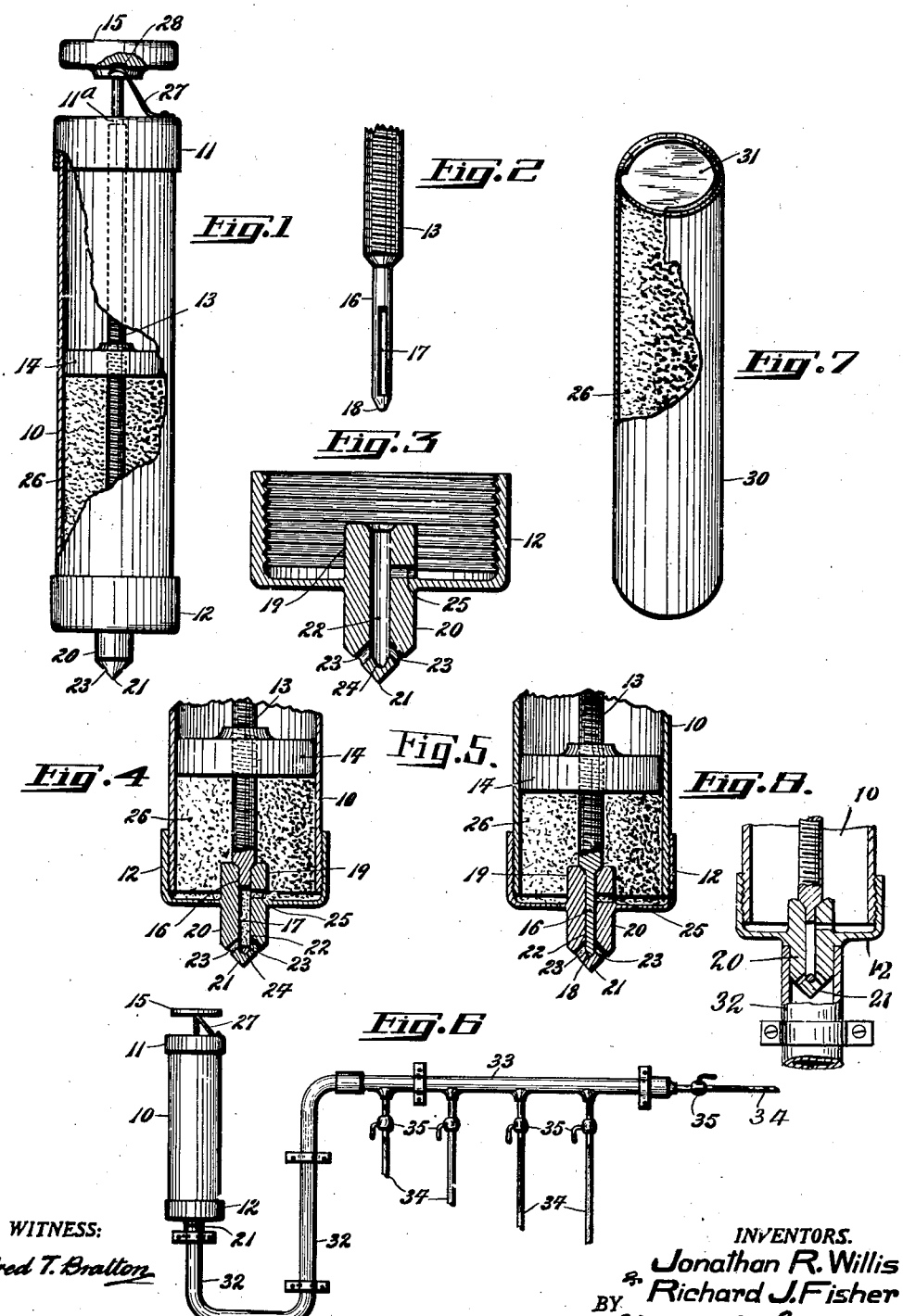
WITNESS:
Alfred T. Bratton
INVENTORS.
Jonathan R. Willis
& Richard J. Fisher
BY Victor J. Evans
ATTORNEY.

UNITED STATES PATENT OFFICE.

JONATHAN R. WILLIS AND RICHARD J. FISHER, OF PHILADELPHIA, PENNSYLVANIA, ASSIGNORS TO GENERAL EXCELLO MANUFACTURING COMPANY, OF WILMINGTON, DELAWARE, A CORPORATION OF DELAWARE.

FLUID, SEMIFLUID, OR PLASTIC EJECTOR.

1,325,386.      Specification of Letters Patent.      Patented Dec. 16, 1919.

Application filed April 7, 1919. Serial No. 287,999.

*To all whom it may concern:*

Be it known that we, JONATHAN R. WILLIS and RICHARD J. FISHER, citizens of the United States, residing at Philadelphia, in the county of Philadelphia and State of Pennsylvania, have invented new and useful Improvements in Fluid, Semifluid, or Plastic Ejectors, of which the following is a specification.

The invention relates to devices for ejecting a fluid, semi-fluid or plastic substance, and has for an object to provide a simple device for containing the fluid or substance, and for working the ejection thereof, to given points of disposal and for controlling the ejection and regulating the pressure necessary to accomplish the ejection, to the end that pre-determined amounts of the fluids or substances can be readily applied to the points of disposition thereof.

The invention comprehends among other features, the provision of a device consisting of few and simple parts, and which is in the nature of a container or holder of the fluid, semi-fluid or plastic substance, the latter being subjected to pressure in the operation of the device, to the end that the desired quantity can be ejected from the holder or container with the least amount of work necessary on the part of the operator, and wherein furthermore, the amount of pressure required can be judged by the operator to bring about the ejection of the desired amount of the fluid or substance and also eject it under sufficient pressure to carry it to the point of distribution.

We are aware that various forms of ejecting devices have been used heretofore, as for instance, in the use of collapsible containers for tooth paste, shaving soaps, and the like, in which the container walls are collapsed to work the ejection of the paste from the mouth of the tube. So also in the use of grease cups such as are generally employed on automobiles, the application of pressure on the part of a portion of the cup to the contained substance, works the ejection of the substance to the part desired to lubricate. In both of these instances however, the quantity ejected cannot be controlled to the extent of cutting off the supply and the amount of paste ejected is controlled entirely by the amount of pressure created. In the first instance furthermore, the collapsing of the tube containing the paste works the ruination of the tube and it cannot be readily used again for the same purpose. This results in a waste of good material and thus creates an undue expense.

In our device, we aim to provide a container that can be used over time and again and in which although a pressure is employed to work the ejection of the contents of the container, the amount to be ejected can be controlled, in fact the exact amount can be pre-determined so that there will be no waste in the operation of the device to obtain the desired amount of the fluid, semifluid or plastic substance.

In the further disclosure of the invention, reference is to be had to the accompanying drawings, constituting a part of this specification, in which similar characters of reference denote corresponding parts in all the views, and in which, Figure 1— is a fragmentary side elevation of the device, parts being broken away to disclose the underlying structure.

Fig. 2— is a fragmentary enlarged sectional view taken through a portion of the threaded rod or stem.

Fig. 3— is a fragmentary enlarged sectional view of the nozzle end of the device.

Fig. 4— is a fragmentary sectional view of the ejecting end of the device showing the same in position to eject a quantity of fluid or substance.

Fig. 5— is a similar view showing the manner of cutting off the ejection of any amount of the fluid or substance.

Fig. 6— is an elevation showing a slightly modified form of device to disclose the manner of carrying and conveying a quantity of the fluid or substance to various remote points.

Fig. 7— is a fragmentary perspective view of a container or cartridge that we may employ in connection with our device, and Fig. 8— is a fragmentary detail elevation, partly in section, showing the connection between the container and manifold.

Referring more particularly to the views, the numeral 10 indicates a cylindrical container, having one end fitted with a cap 11, provided with a central aperture 11$^a$, said cap being suitably threaded on to the container, with a second cap or closure 12 threaded on to the other end of the container, a threaded rod 13 being provided to pass through the aperture 11ª of the cap 11 and extend longitudinally through the container as shown. The rod 13 has threadedly engaged therewith, a substantially circular pressure head 14, which snugly fits the bore of the container 10, the exteriorly extending end of the rod 13 being provided with a suitable operating handle 15 which latter, when turned, will impart rotation to the threaded rod 13 to advance or retract the piston or pressure head 14 within the container 10.

The forward end of the threaded rod 13 terminates in a slightly reduced stem portion 16 provided with an elongated cross slot 17 forming a valve, with the extreme forward end of the stem portion 16 rounded to provide a nose 18 as shown. The cap 12 has an inner tubular extension 19 and an outer tubular extension 20 formed to provide a nozzle 21 and a bore 22 which is formed by the tubular formation of the extensions 19, 20 and extends through from the interior of the container to the forward end of the nozzle 21, at which point it merges into a plurality of opposed diagonal passages 23 with the nose 18 adapted to repose upon a suitable cupped seat 24 formed between the passages 23. A diametrically extending passage 25 is formed in the extension 19 to connect the interior of the container with the bore 22 at the point of disposition of the slot 17 when the stem 16 is disposed to extend through the bore 22 as illustrated in the views and this passage 25 when open will permit of a fluid, plastic or semi-plastic substance 26, carried in the container 10, to pass through the container into the passage 25 and thence down through the elongated slot 17 to the passages 23, thus ejecting the fluid or substance from the nozzle by reason of the pressure created within the container when the threaded rod or screw 13 is turned to advance the piston or head 14 in the container and against the contents thereof.

Now referring to Figs. 4, 5, it will be apparent that the turning of the knob or handle 15, bringing about rotation of the screw or rod 13, will not only advance the piston 14 in the container, but will also bring the elongated slot 17 into registration with the passage-way 25 so that the resulting compression or tendency to compress the fluid or material in the container, will cause said fluid or substance to pass through the passage-way 25 into the elongated slot 17 and thence out through the passage-ways 23, and, referring now to Fig. 5, it will be apparent that further rotation of the screw or head 13 will move the slot 17 out of registration with the passage-way 25, thus cutting off the further supply of fluid or substance to the nozzle 21.

If desired the cap 11 may be fitted with a suitable spring element 27 bearing against the underside of the knob or handle 15 and which on its underside is provided with a series of depressions 28, causing the free end of the spring to click into the depressions when the handle is turned. In this manner the threaded stem and its component parts may be so designed that a turn of the handle to bring the free end of the spring from one indentation to the other, resulting in a click, will bring about sufficient advancement of the piston or head in the container to press out through the nozzle, a determined number of drops of the fluid, or a determined quantity of the substance, as the case may be, and the subsequent turn of the handle to another click, will then shut off the supply of the fluid or substance to the nozzle. Thus a predetermined supply of the fluid or substance to the nozzle can be accurately accounted for and by having the container substantially air tight, particularly in front of the piston or head, the relieving of the pressure on the inside of the container, in the event the passage-ways are open, will still prevent any further supply of the fluid or material from passing out through the nozzle.

In Fig. 7, we show a form of cartridge indicated by the numeral 30, which may have its cylindrical portion made of celluloid, paper or some other suitable material, and which cylindrical portion is filled with the desired substance such as tooth paste or shaving soap, and capped at both ends, by suitable caps 31. This cartridge can be readily packed or shipped and when it is desired to use the same, the cap at one end of the container can be removed and the cartridge, filled with the substance, can be readily inserted in the container which is then employed in the usual manner as described.

Based on the theory and practical embodiment that a tube filled with a quantity of fluid and then closed at one end will hold the fluid and prevent it from flowing out of the open end, regardless of the position in which the tube is held, we disclose in Fig. 6, a modified form of our device, and in which instance the container 10 with its parts described heretofore, has attached to the nozzle 21, a supply pipe 32 which in turn connects with a second pipe or manifold 33, the latter having a series of smaller tubes or pipes 34 extending therefrom, each preferably provided with a stop cock or valve 35. With this arrangement, assuming that the container is filled with a fluid, it will be seen that a turn imparted to the threaded stem in the container will cause a quantity of the fluid to be forced out of the nozzle 21, into the pipe 32 and thence on through those of the tubes or pipes 34 of which the respective stop-cocks are open, and that when, by an additional turn or part of a turn of the threaded stem in the container, the supply to the nozzle is cut off, the further supply of fluid to the tubes or pipes 34 or the flow thereof through these pipes, will be stopped and thus it is possible by operating the device described in a pre-determined manner to supply to the various individual conveying tubes or pipes, a pre-determined amount of the fluid, shutting off the further supply of said fluid at the will of the operator.
It will be noted that in the use of the device described the feeding of the fluid or substance from the container to the nozzle takes place when the elongated slot, in the extremity of the screw rod, and which forms the valve as mentioned heretofore, is in registration with the passage 25 and the passage ways 23, the passage way 25 and the passage ways 23 together with the elongated slot 17, being in the same vertical plane when the fluid or substance is fed from the container to the nozzle and through the latter and that when the elongated slot 17 is positioned at right angles to the passage ways 23 and the passage way 25, the material forming the walls of the slot, acting as a part of the valve, will close the passage ways 23 and also the passage way 25 thus not only cutting off the supply of the fluid or substance from the container to the elongated slot or valve, but from the valve to the passage ways 23 leading to the exterior of the nozzle.

From the foregoing description it will be seen that the device described is of a simple construction, consisting of few parts that cannot readily get out of order and that in the use of a screw for the advancement of a piston or head in a container, a great pressure can be brought to bear upon the contained fluid or substance and thus the device may be adapted to various uses for the purpose of conveying a portion of the confined quantity of a fluid, plastic or semiplastic substance to a particular place of disposal and the supply cut off instantly at the will of the operator.

Although we have shown a particular form of the invention and described particular applications thereof in this specification, it will be understood that we do not limit ourselves to the specific disclosures herein; that various slight changes may be made from the construction set forth in the drawings and described herein, without departing from the spirit of the invention, and that the scope of the invention is defined by the appended claims.

Having described our invention, we claim,

1. A device of the character described, comprising a container, a screw extending longitudinally through the container, caps, one for each end of the container and forming bearings for said screw, an operating handle on an exterior portion of the screw, a pressure head mounted on the screw to move longitudinally within the container when the screw is actuated, a nozzle on one of the caps and a valve formed with the screw and extending into the nozzle, said valve controlling the ejection of the contents or a portion of the contents of the container to and through the nozzle simultaneously with the operation of the screw to move said pressure head in said container.

2. A device of the character described comprising a container, a screw passing through the container, caps, one for each end of the container and forming bearings for said screw, a nozzle on one of the caps, and provided with a passage-way, a valve formed at one end of the screw and including an elongated slot, a second passage-way from the container to the valve and a pressure head mounted on the screw in the container, the operation of said screw to actuate said head, causing said elongated slot to be moved into or out of registration with said passage-ways.

3. In a device of the character described the combination with a container and mechanism for ejecting the contents thereof, of a nozzle having an inlet thereto and an outlet therefrom and means normally closing the inlet and outlet and associated with the said mechanism to be actuated with the latter to simultaneously open said inlet and outlet and simultaneously close the same.

4. A device of the character described comprising a container, a screw mounted in the container, a head on said screw and movable in the container by the action of the screw to eject portions of the contents of the container, a nozzle on the container, a passageway in the nozzle, a second passageway from the container to the nozzle and an interposed valve operable with said screw to open or close said passageways for controlling the ejection of the contents or portions of the contents of the container when the screw is actuated to exert a pressure on the contents of the container through the medium of said head.

5. In a device of the character described the combination with a container and mechanism for ejecting the contents thereof, of a nozzle on the container and provided with an inlet from the container to the nozzle and an outlet remote from the said inlet and ejection controlling means normally closing the said inlet and outlet and associated with the said mechanism to be actuated with the latter to simultaneously open or close the said inlet and said outlet.

6. In a device of the character described the combination with a container and mechanism for ejecting the contents thereof, of a nozzle for the container and provided with an inlet and an outlet and ejection controlling means interposed between the inlet and outlet and associated with the said mechanism to be actuated with the latter for simultaneously opening or closing the said inlet and outlet.

7. In a device of the character described the combination with a container and mechanism for ejecting the contents thereof, of a nozzle provided with inlet and outlet passages and a slotted valve interposed between the inlet and outlet passages and associated with the said mechanism to be actuated with the latter to bring the slot of the valve into or out of registration with the said passages to open or close the latter when the mechanism is actuated.

8. A fluid, semi-fluid or plastic ejector comprising a container for the substance, a nozzle on the container and provided with inlet and outlet passages, a mechanism for ejecting the contents or portions of the contents of said container and revoluble means associated with the mechanism to be actuated with the latter to open or close said passages, controlling the supply of said substance to and from the nozzle.

9. A device of the character described, comprising a container, a screw extending through one end thereof, an ejecting head on said screw and movable by the same in the container, a nozzle at the other end of the container, and a valve on the screw and operable in said nozzle to regulate discharge of the contents of the container in proportion to the extent of movement of the follower.

10. In a device of the character described, a container having a nozzle, a follower movable in the container, and a revoluble unit provided with means for moving the follower and regulating discharge of the contents of the container in proportion to the extent of movement of the follower.

11. A dispensing device comprising a container, and expelling mechanism therefor, including a movable follower and positive revoluble means associated therewith for driving said follower and for controlling discharge of the contents of the container proportionate to the displacement of the follower.

12. A dispensing device comprising a container, a nozzle on the container having inlet and outlet ports, a movable follower in the container, a revoluble member provided with means for moving the follower in either direction, and means carried by said member for controlling the inlet and outlet ports.

13. A dispensing device comprising a container, a nozzle on the container having inlet and outlet ports, a movable follower in the container, a revoluble member provided with means for moving the follower in either direction, and means carried by said member for simultaneously controlling the inlet and outlet ports.

14. A dispensing device comprising a container, a nozzle on the container having inlet and outlet ports, a movable follower in the container, a revoluble member provided with means for moving the follower in either direction, and revoluble means carried by said member for simultaneously controlling the inlet and outlet ports as the follower is moved.

15. In a dispensing device, a container, a nozzle thereon having inlet and outlet ports, a movable follower in the container, a member for moving the follower in either direction, and a needle on the member having a single port connecting the inlet and outlet ports in certain positions of the member.

16. A dispensing device comprising a container, a nozzle on the container having inlet and outlet ports, a movable follower in the container, a member provided with means for moving the follower and a slotted valve on the member and operable therewith for controlling the said ports.

17. A dispensing device comprising a container, a nozzle on the container and having an inlet and an outlet communicating with the central bore of the nozzle, an expelling mechanism for the container and means disposed longitudinally of the bore of the nozzle within the same and operable in association with said expelling mechanism for controlling the discharge of the contents of the container through the nozzle proportionately to the displacement of the follower in the container.

In testimony whereof we affix our signatures.

JONATHAN R. WILLIS.
RICHARD J. FISHER.